Jan. 1, 1924

J. C. CONRAD

RAT TRAP

Filed May 13, 1921

J. C. Conrad, INVENTOR

BY Victor J. Evans, ATTORNEY

WITNESS:

Patented Jan. 1, 1924.

1,479,283

UNITED STATES PATENT OFFICE.

JAMES C. CONRAD, OF WASHINGTON, DISTRICT OF COLUMBIA, ASSIGNOR TO EDWIN P. CONRAD, OF ZIONSVILLE, INDIANA.

RAT TRAP.

Application filed May 13, 1921. Serial No. 469,261.

*To all whom it may concern:*

Be it known that I, JAMES C. CONRAD, a citizen of the United States, residing at Washington, in the District of Columbia, have invented new and useful Improvements in Rat Traps, of which the following is a specification.

This invention relates to an animal trap, the general object of the invention being to provide means for catching a number of animals one at a time by providing a trap with self-setting means, the trapped animal being forced into a holding cage in the operation of the trap, and at the end of the operation the parts are in condition for catching another animal.

Another object of the invention is to provide means whereby the cage containing the trapped animals can be closed and detached from the rest of the trap so that the cage with the animals therein can be carried to a place where the animals can be destroyed.

A still further object of the invention is to provide a spring actuated rotary member composed of a plurality of radial blades, the spaces between the blades forming trapping compartments with a trigger for releasing the member and a door for closing the compartment when the member is actuated to force the animal into the cage.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 4 is a fragmentary view of one end of the trap showing the entrance door and the propelling means.

Figure 1:
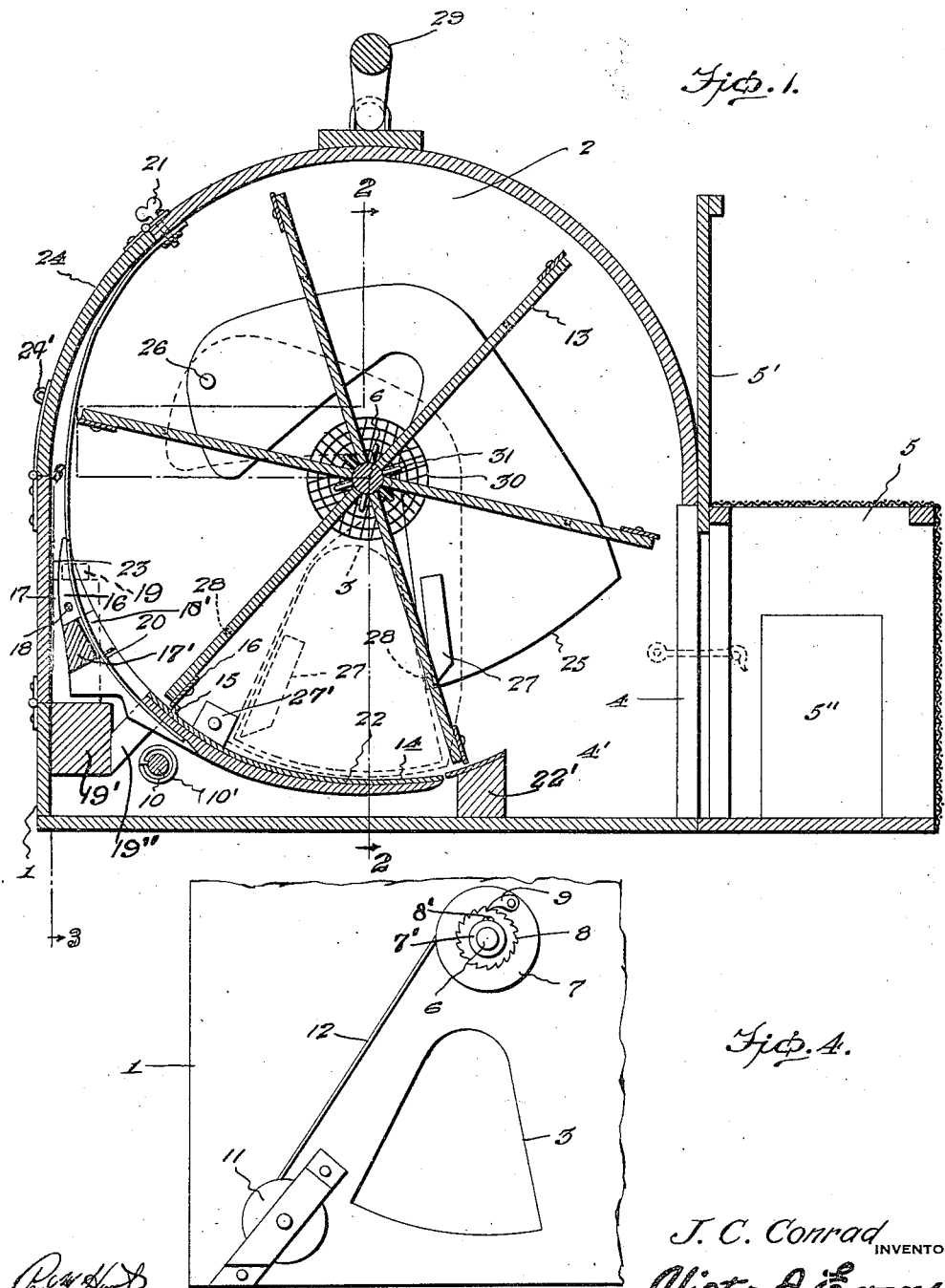
Figure 1 is a cross sectional view of the invention.
Figure 2:
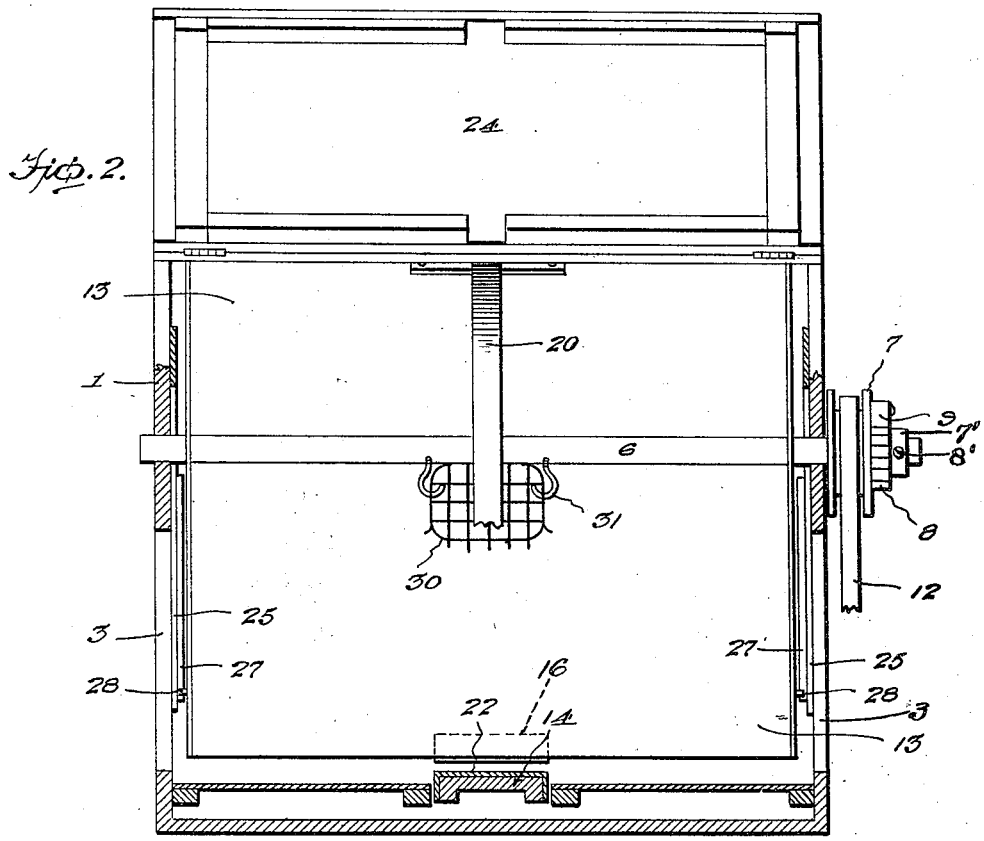
Figure 2 is a longitudinal sectional view taken on the line 2—2 of Figure 1.
Figure 3:
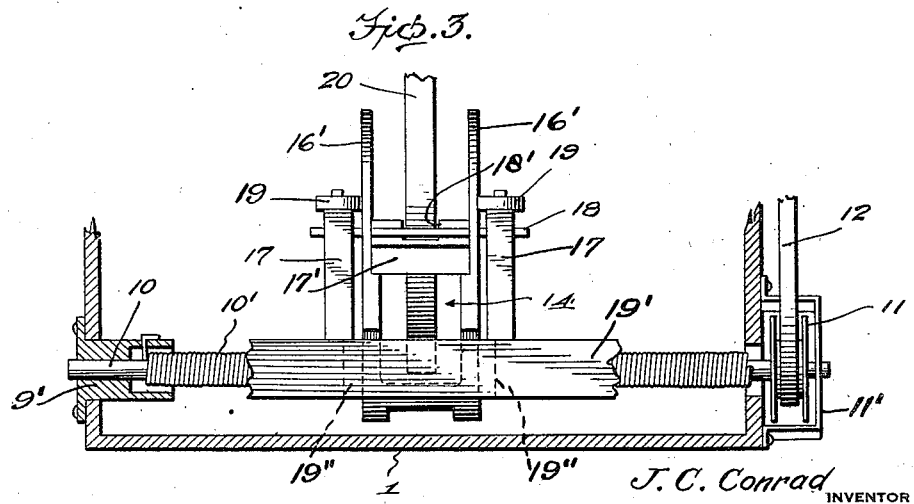
Figure 3 is a sectional detail view taken approximately on line 3—3 of Figure 1 looking in the direction of the arrow and showing the spring actuated roller and a portion of the trigger means.

In these views 1 indicates a casing which is so made as to provide a circular chamber 2, each end of the casing having an entrance opening 3 for permitting the animal to pass into the chamber. These openings are in alignment with each other. An opening 4 is formed in one side of the casing and a cage 5 is adapted to be detachably secured to this side with its open side registering with opening 4.

A shaft 6 passes through the casing and this shaft is journaled in the ends of the casing. One end of the shaft projects a considerable distance beyond the end of the casing and this projecting end carries a pulley 7 which is loosely mounted on the shaft and a ratchet wheel 8 which is secured to the shaft by means of the removable sleeve 7'. A set screw 8' passes through the sleeve for engagement with the shaft. The pulley carries a dog 9 for engaging the ratchet wheel. A spring roller 10 is journaled in the lower part of the casing with one end projecting beyond the casing, this roller being somewhat similar to the well-known type of shade roller. One end of the roller is journalled through bearing member 9', while the projecting end is journalled in the bracket 11' and the projecting end of this roller carries a pulley 11 to which is secured one end of the belt 12, the other end of the belt being connected with pulley 7. These parts are so arranged that the movement imparted to roller 10 by its spring 10' will be communicated to pulley 7 and this movement of pulley 7 will rotate shaft 6 by means of the ratchet mechanism shown. By turning the pulley 7 in a clockwise direction the dog will ratchet over the wheel 8 and the belt will cause the pulley 11 and roller 10 to revolve so as to wind up the spring 10'.

Radial blades 13 are secured to shaft 6 and these blades are adapted to divide the circular chamber into a plurality of compartments, the lower one of which is adapted to receive the animal passing into the chamber through one of the openings 3. The rotary member composed of the shaft and blades is caused to come to rest with a compartment in register with the entrance openings by means of a trigger member 14, forming a portion of the circular wall of the chamber, and provided with a lip 15 which is adapted to engage a wear plate 16 on the free end of each blade. This trigger member is of arc-shape, as shown, and has formed on its upper end spaced arms 16' which are pivoted adjacent their upper ends to the uprights 17 by the pivot pin 18. The arms are held spaced apart by means of the block 17' which is provided with a slot 18'. Rollers 19 are rotatably mounted on the upper ends of the uprights and engage the upper end of the trigger member to hold the same against lateral play. The uprights have their lower end secured to a transverse supporting member 19' which provides an abutment for the arms of the trigger. Inclined upwardly from the transverse supporting member and arranged on both sides of the trigger and are spaced guide members 19" to prevent lateral movement of the trigger. The lower part of this trigger member extends across the bottom of the circular chamber so that the animal passing into the chamber will walk over the trigger member and its weight will tilt the member upon its pivot so as to release the blade from the lip 15 to permit the rotary member to revolve. This movement of the rotary member will force the rat into the offset part 4' of the chamber so that he will enter the cage 5 through opening 4 but as soon as the next blade strikes the lip the rotary member will come to rest with the parts in condition to receive another animal. The trigger is held in raised position by means of the leaf spring 20 which is adjustably secured at its upper end to the upper part of the casing by the bolt 21, and extends downwardly between the arms 16' and through the slot 18' to engage the central portion of the trigger for holding the trigger in operative position. The upper face of the trigger member is preferably covered with metal, as shown at 22 and the bottom of the chamber is also formed of metal. Extending across the chamber and arranged adjacent the lower end of the trigger there is a transverse member 22' having its upper portion curved to conform to the curvature of the trigger and said curved portion is covered with metal. A door 23 is provided in the front of the casing for permitting access to the upper part of the trigger member and the upper portion 24 of the casing is made in the form of a hinged door to permit inspection of the interior of the said casing. The doors have their free ends in contacting engagement when closed and locking means 24'.

In order to prevent the animal from attempting to escape through the openings 3 when the rotary member starts to move I provide door members 25 for closing the same, each member being of substantially L-shape with its horizontal arm pivoted at 26 to the end wall of the casing an appreciable distance from the center thereof so that its vertical arm will assume a position closing the entrance opening under the action of gravity. A weight 27 may be connected with said vertical arm to insure the closing movement of the door member and secured to the side walls of the casing in the path of the weights are stop members 27', which limit the movement of the door members 25, as shown in dotted lines in Figure 1. Each member is held in raised position by means of a pin 28 on the end of each blade which is arranged to engage a part of the door member, preferably the weight 27. As shown in Figure 1 this pin engages the extreme end of the weight when the parts are at rest so that the door member is held in raised position, as shown in dotted lines in Figure 1. As soon as the rotary member starts to move the forward upward movement of the door member by the pin will cause the weight to pass beyond the pin, thus freeing the door member from the pin and permitting it to drop to closed position. The weight is engaged by the pin of the next blade, however, and is again raised to open position before the rotary member comes to rest.

A door 5' is provided for closing the open side of the cage 5 and a handle 29 is connected with the upper part of the casing for facilitating transportation of the same.

From the above it will be seen that the trap is set by winding the spring roller by means of the pulley 7. The trigger will hold the rotary member in a position with one of the compartments formed by a pair of blades in register with the entrance openings so that a clear passage entirely through the trap is provided. Bait cages 30 are detachably secured at the apexes of the compartments by the screw hooks 31 engaging shaft 6 so that by placing bait in these cages the animal will be enticed into the trap. The bait cage is placed directly over the trigger so that the animal in attempting to reach the bait will step on the trigger, thus causing the same to tilt under his weight so as to withdraw lip 15 from plate 16 to permit the spring roller to revolve the rotary member, this movement continuing until the next blade strikes the lip. In the first part of this movement the door members 25 will drop to close the entrance openings and the rear blade will shove the animal into the space 4' from which he will run into the cage 5. After this movement ceases the parts are in set position so as to be ready to receive another animal. The untrapped animal will be attracted by the animals already caught as well as by the bait in the cages. After the cage 5 has become full the door 5' can be closed and the cage separated from the trap and the animals taken to a place where they can be destroyed. One end of the cage 5 may be provided with a door 5" for removing the animals therefrom.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A trap of the class described comprising a casing having a circular chamber therein and an inlet opening leading into the chamber and an outlet opening leading therefrom, a rotary member in the chamber including a number of blades, means for rotating said member, a spring actuated trigger member, a lip thereon for engaging each blade, a weighted door eccentrically arranged in relation to the rotary member for closing the inlet opening under the action of gravity and a pin on each blade for engaging the door to hold the same in open position when the member is at rest and to free the same as soon as the member starts to move.

2. A trap of the class described comprising a casing having a circular chamber therein, each end of the casing having an inlet opening and one side of the casing having an outlet opening, a rotary shaft in the casing, blades connected therewith, spring actuated means for rotating the shaft, a spring actuated trigger member having a part thereon for engaging the blades to hold the rotary member against movement, a cage detachably connected with the casing and having an opening therein registering with the outlet opening, a door for closing said opening in the cage, an L-shaped door for each inlet opening, each door being eccentrically mounted in relation to the rotary member so as to drop to closed position under the action of gravity and a pin on each blade for holding the door open when the rotary member is stationary and releasing the door as soon as the member begins to move.

In testimony whereof I affix my signature.

JAMES C. CONRAD.